No. 706,211. Patented Aug. 5, 1902.
R. H. APELT.
TROLLEY WHEEL.
(Application filed Mar. 30, 1901. Renewed Dec. 19, 1901.)
(No Model.)
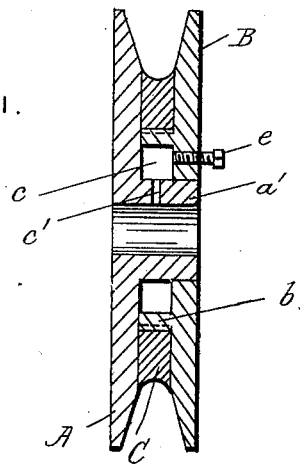
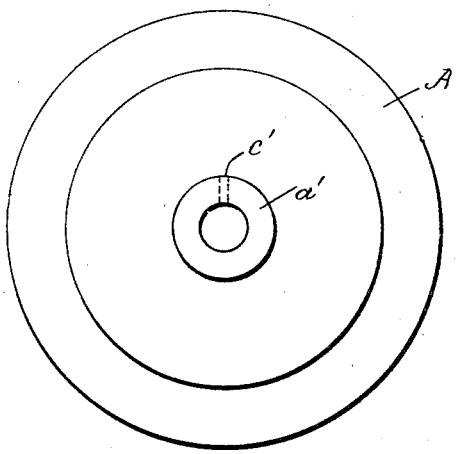 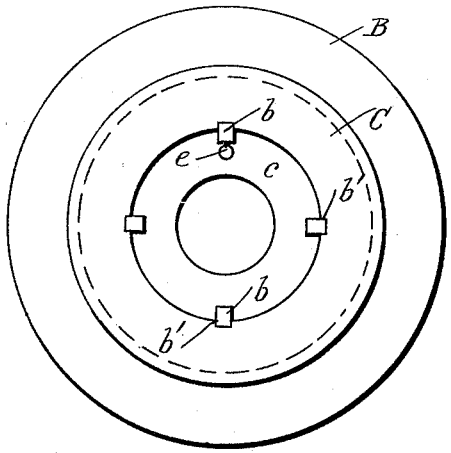
WITNESSES
James M. Shear
A. G. Huffman
INVENTOR
Rudolph H. Apelt.
by Herbert W. T. Jenner.
Attorney

UNITED STATES PATENT OFFICE.

RUDOLPH H. APELT, OF BOSTON, MASSACHUSETTS.

TROLLEY-WHEEL.

SPECIFICATION forming part of Letters Patent No. 706,211, dated August 5, 1902.

Application filed March 30, 1901. Renewed December 19, 1901. Serial No. 86,534. (No model.)

*To all whom it may concern:*

Be it known that I, RUDOLPH H. APELT, a citizen of the United States, residing at Boston, in the county of Suffolk and State of Massachusetts, have invented certain new and useful Improvements in Trolley-Wheels; and I do hereby declare the following to be a full, clear, and exact description of the invention, such as will enable others skilled in the art to which it appertains to make and use the same.

This invention relates to trolley-wheels for use on electric railroads; and it consists in the novel construction and combination of the parts hereinafter fully described and claimed.

In the drawings, Figure 1 is a section through the wheel. Fig. 2 is a side view of one flange-plate and the hub. Fig. 3 is a side view of the tread-ring and the other flange-plate.

A is a flange plate or disk provided with a hub $a'$, which is bored out to fit the pin upon which the trolley revolves.

B is a second flange plate or disk, which is secured upon the end portion of the hub $a'$. The disk B may be secured in any approved manner which will permit it to be removed when desired, as by making it a close fit on the hub and forcing it onto the hub.

C is a tread-ring, which is interposed between the two disks A and B and which may be taken out and renewed as often as becomes worn by contact with the line-wire.

The ring C has a hole considerably larger than the hub $a'$, so that an oil-chamber $c$ is formed around the hub, and the said hub has an oil-hole $c'$, so that the oil may lubricate the trolley-pin.

One of the disks, preferably the disk B, is provided with a series of projections $b$, and the tread-ring has a series of slots $b'$, which are slid over the projections $b$, so that the tread-ring is secured to the disk B concentric with the trolley-pin.

An oil-screw $e$ is provided for admitting oil into the chamber $c$.

It is obvious that either flange A or B can also be replaced should it become worn or broken without having to throw away the whole trolley-wheel.

What I claim is—

1. In a trolley-wheel, the combination, with a flange-plate provided with a hub having an oil-hole in it, of a second flange-plate slidable on the said hub, one of the said flange-plates being also provided with a series of lateral projections, and a tread-ring provided with grooves which slide over the said projections, an oil-chamber being formed by the two said flange-plates around the said hub and within the tread-ring, substantially as set forth.

2. In a trolley-wheel, the combination, with a flange-plate provided with a hub, of a flange-plate secured on the said hub and provided with a series of projections, and a tread-ring provided with grooves which engage with the said projections and having also a central opening which forms an oil-chamber between the said flange-plates, substantially as set forth.

In testimony whereof I affix my signature in presence of two witnesses.

RUDOLPH H. APELT.

Witnesses:
ALICE J. MURRAY,
FREDK. K. DAGGETT.